Aug. 3, 1926.
K. B. STUART
1,594,386
INDICATING VALVE STEM
Filed June 27, 1925    2 Sheets-Sheet 1
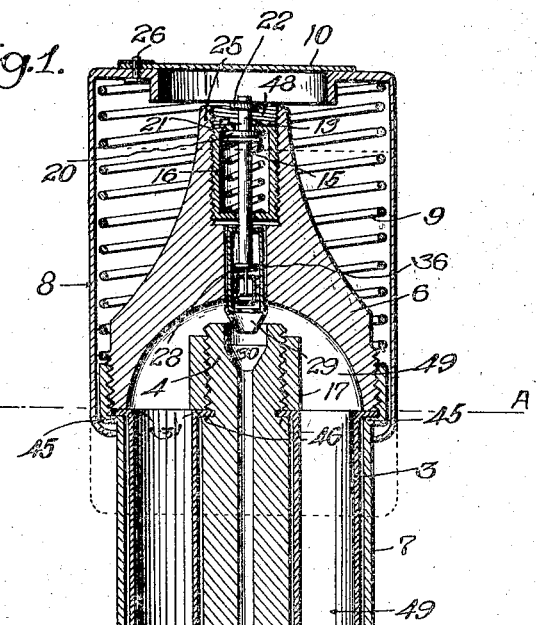
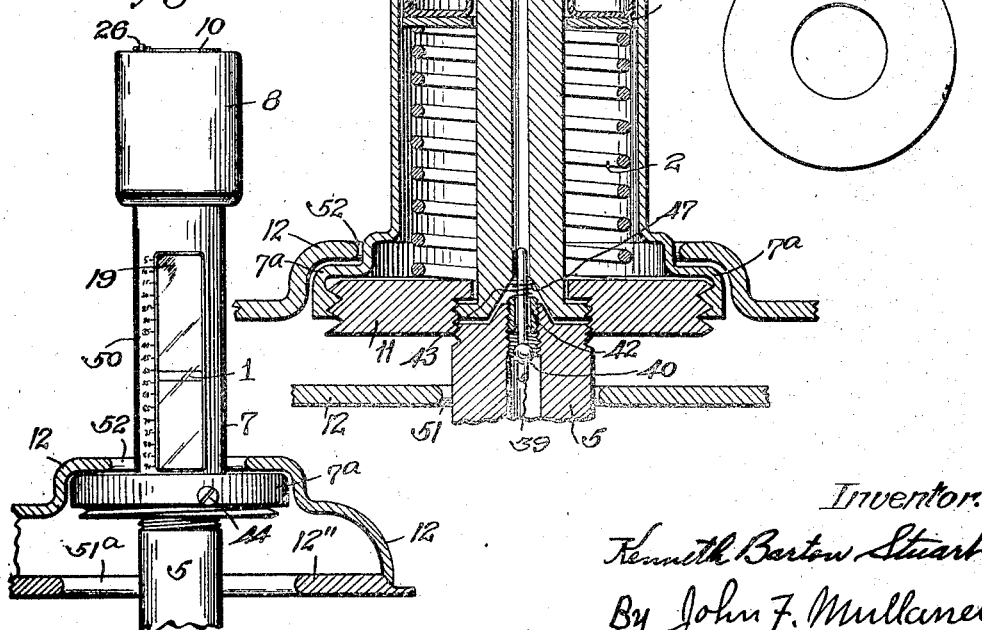
Inventor.
Kenneth Barton Stuart
By John F. Mullaney,
Attorney.

Aug. 3, 1926.
K. B. STUART
1,594,386
INDICATING VALVE STEM
Filed June 27, 1925    2 Sheets-Sheet 2
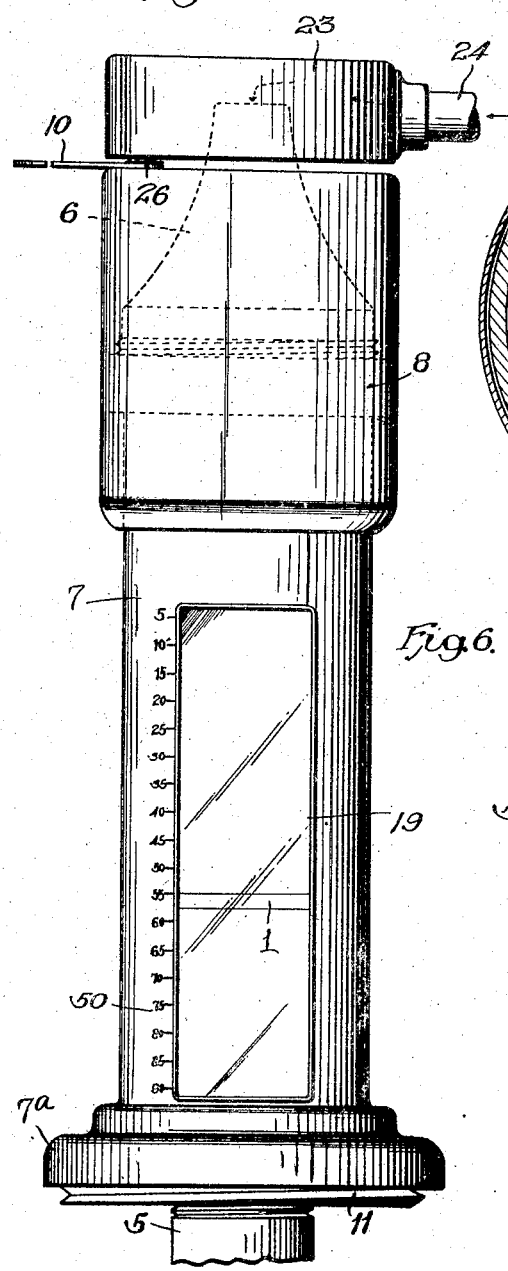
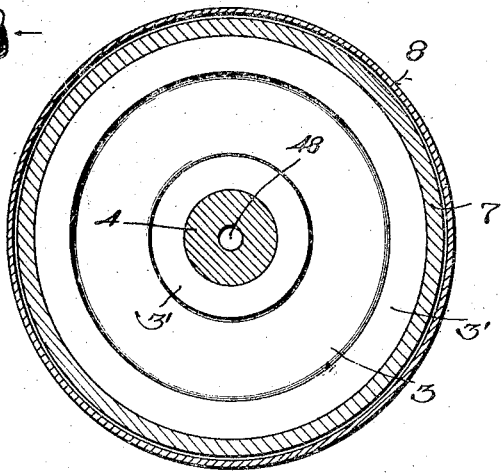
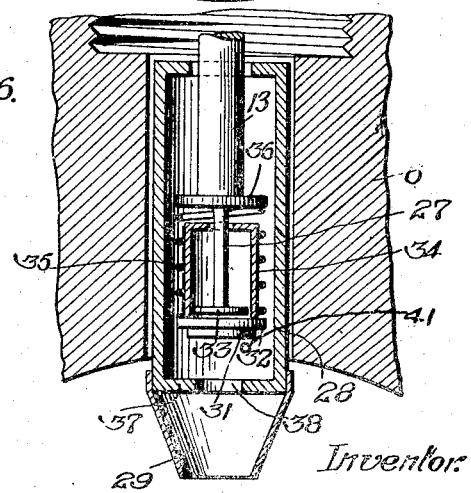
Inventor:
Kenneth Burton Stuart
By John F. Mullaney.
Attorney.

Patented Aug. 3, 1926.

1,594,386

UNITED STATES PATENT OFFICE.

KENNETH BARTON STUART, OF COLORADO SPRINGS, COLORADO.

INDICATING VALVE STEM.

Application filed June 27, 1925. Serial No. 39,971.

My invention relates to improvements in indicating valve stems in which the pressure within a pneumatic tire or other container holding fluid under pressure is indicated constantly to an observer without the need of any manipulation or use of any exterior appliance; and some of the objects of my improvement are, first, to provide an automatic indicating valve stem that will indicate automatically the fluid pressure within the container to which it is connected operatively; second, to provide means for shutting off the outlet of fluid from said container on removing the valve stem; third, to provide means for regulating and reducing the pressure within said container; fourth, to provide means for not loosing the stem.

I attain these said objects by means of the appliance described in the accompanying drawings, in which—

Figure 1, is a sectional elevation, in part, of the appliance, showing parts of the interior and exterior; Fig. 2, is an elevation of part of the exterior and part of the interior positioned as while being charged with air; Fig. 3, is a transverse section of the valve stem on the line A—A in Fig. 1; Fig. 4, is a diagrammatic outer view elevation of the appliance, approximately its normal size; Fig. 5, is a plan view of the flat pressure ring 1; Fig. 6, is a greater enlarged elevation of the inner part of the sliding tube 28, and its connecting parts, with some parts removed to disclose the parts within.

Similar numerals refer to similar parts throughout the several views.

The central tube member 4, is threadably secured to the base tube 5, by means of the annular connecting nut 11, Fig. 1. On the top face of said nut 11, is seated a coil pressure spring 2, which supports the flat pressure ring 1, against the pressure of the inflated elastic air container 3. Mounted threadably on the annular connecting nut 11, is the lower casing member 7, and on the inner side of said nut is threadably connected the base tube member 5, thus securing threadably the parts 4, 5, 7, and 11 together as a unit. Then I have inserted within the annular recess between casing member 7 and the central tube member 4, the elastic air container 3, with its transversely extending annular flanges 3′ in contact with and resting on provided abutments, 45 and 46, in 7, and 4, respectively. The female nut 17, is screwed down on the central tube member 4 against the inwardly extending flange 3′ compressing them against the abutment 46, and the upper tube member 6, is screwed down into the upper end of the lower casing member 7, and against the outwardly extending annular flange 3′ compressing it down against the abutment 45 thus forming an elastic and expandable air container of the chambers of 3 and 6 together and expandable against the pressure spring 2.

The upper casing member 8, shown in Figs. 1, 2, 3, and 4, covers the outer end of the stem mechanism and has its lower end crimped under the abutment 45 of 7, and extended against said abutment 45 by the expansion of the coil spring 9, in Fig. 1. The swing shutter 10, pivotally secured on the outer and open end of 8, at 26, is adapted to close and protect the air tube 48, extending longitudinally through the whole length of the valve stem, and its several connected parts.

The base tube member 5, is the part secured to the inner tube by any appropriate form or means desired and passes through the casing and wheel-rim 12 or other casing and is provided to be detached from the rest of the valve stem by setting the locking screw 44 in Fig. 4, against the annular connecting nut 11, and turning it off of the member 5, thus allowing the check valve 40, to be pressed up against its seat 42, by the action of the spring 43 against the cross pin 47 in the stem 39 and so shutting off the escape of air from the inner tube or other container upon which my invention is being used. When the outer part of the valve stem is replaced it will automatically re-open the check valve at 40, so that an equal pressure will exist in the air chamber 49, and the inner tube of a tire or other container to which this appliance is connected. Thus the pressure of the air from the tire forces the rubber partly enclosing the air chamber 49, down against the flat presure ring 1 and forces it downward, as shown in the window 19, which may be covered by a transparent member or open as desired, and its position indicating the pressure on a number scale on the outside of the lower casing member 7. This indicator must be correct as the connection of the air is continuous from the inner tube through the open air tube 48 at all times while the valve stem is on the tube, and is one of the main virtues of this appliance.

As the air in the auto tire, or other fluid container to which this indicating valve stem is connected, may be compressed it will dilate the elastic air container 3 and move it along the index or window 19, and if the pressure is undesirably great the operator may release some of the air by shoving the shaft 13 downwardly, slightly, so as to force the sliding tube 28 into the air chamber 49 until the small outlet holes 41, in Fig. 6, can receive the air from said air chamber 49 and allow it to escape through the opening between the gasket 20 and its valve seat 21.

In the inflation of the tire, or other fluid container, through this appliance the air chuck member 23, secured to the air supply tube 24 operatively, is pressed down against the outer end of the appliance, after the swing shutter 10, has been opened as shown in Fig. 2; and this forces the upper casing 8 down on the lower casing 7, and allows the outer end 25, of the upper tube 6 to project its taper sides into the chuck 23, until the shaft 13 is shoved so as to open the feed valve 15, when the air from the chuck will force the sliding tube 28 to slide down and force its lower end 29 into the receiving recess 30, and so conduct the feed air through the inlet air tube 48. On the withdrawal of the pressure from the chuck, the air from 48 will force the sliding tube 28 back to its normal position as shown in Fig. 1, and the pressure spring 14 will force the valve 15 so that the gasket 20 will shut against the seat 21 and the pressure in air chamber 49 will be same as in the tire, and be indicated on the indicating scale 50.

In releasing part of the excess pressure from a tire, the operator opens the swing shutter 10, pivoted at 26, and the check ring 22 will prevent it going too far as it comes into contact with the projecting valve seat flange 21, which is a formed annular integral part of the threaded tubular casing 16, carrying the pressure spring 14.

The lower extension plunger 27 at the lower end of shaft 13 has a plunger head 33 at its end provided to contact with the inwardly formed annular flange at the outer end of the valve tube 34, Fig. 6, when actuated downwardly by the coil spring 35, expanding between the resisting disc 36 and the valve disc 32, which carries the gasket 31 against the valve seat 37, which closes the air passage 38, in the taper end 29; forces the sliding tube 28 inwardly until the small outlet hole 41 is within the air chamber 49 allowing the air to escape through said hole 41.

To prevent the loss of the valve stem by becoming detached by accident or by theft, I have arranged it so that the outwardly extending rim 7ª, at the base of the lower casing member 7, shown in Figs. 1 and 4, will not pass through the hole 52, in the metal rim of the wheel upon which the valve stem is mounted. So it will be necessary to remove the tire with its demountable rim from wheel rim and then unscrew the valve stem from the base tube member 5 before removing the tire from the demountable rim, as shown in Fig. 1, where the hole 51, in the demountable rim 12′ is smaller than the diameter of the outwardly extending nut 11: but in Fig. 4, I have shown a demountable rim 12″, with a hole 51ª, large enough for the whole valve stem to pass through without being dismembered. As I am not claiming patent on the form of rim for the tire in this application, because of division of classification, I omit a preference in the size of the hole in the demountable rim, but retain the wheel rim with a hole too small for the passage of the outwardly extending rim 7ª, on the lower casing member 7, for the reasons specified above, to prevent loss.

Where it is required, I prefer to construct the scale 50 in a circle and have the index hand actuated on a pivotal carriage by connection with said pressure ring 1, instead of the longitudinal scale 50.

Having thus described my appliance, I do not wish to claim the sole invention of valve stems, as I am aware that there are numberless forms of them, and that I am entitled to the public use of the general principles of them and their valves, with the rest of the public, and hereinafter set forth some of the heretofore patented parts that are not controlled by live patents, by reason of the expiration of their Letters Patent, and which I wish to combine for a novel use. So I claim as my invention:—

1. A removable locked indicating valve stem of the class described, comprising in combination an expandable air chamber in direct connection with the air in a pneumatic tire and comprising in part a section of said valve stem with metallic walls and in part a section of said valve stem lined with a flexible rubber member actuated by a pressure spring opposed to the compressed air, an indicating member on said chamber's movable end and actuated by said spring and indicating the variance of air pressure in said air chamber, a base member connected in juxtaposition with the pneumatic tire, a shut-off check valve in said base member, a removable tubular member threadably secured to said base member, an enlarged flange on said removable tubular member at its connecting end adapted to prevent it passing through the valve stem hole in the metal rim of the tire wheel from the tire side, an indicating scale on said tubular member in juxtaposition with said indicating member and adapted for indicating the pounds pressure, a sliding tubular member loosely mounted within the outer part of said removable tubular member and adapted to be forced across the opening in the said metal walled part of said air chamber by the pressure of air from the supply tube so as to conduct the supply of air to the inlet connecting with the pneumatic tire, substantially as set forth.

2. A lockable, removable, indicating valve stem of the class described for pneumatic tires and similar fluid containers, comprising in combination a base tube member directly connected to the pneumatic tire, a removable tubular member threadably connected to said base tube member and provided with a registering air conduit, an expandable and reducible air chamber within said removable tubular member and having metallic walls for its upper part and having walls of expandible elastic rubber or other suitable material lining the rest of its cavity and said chamber normally connecting directly with the air in the said tire, a spring-closed check valve at the outer end of the removable tubular member adapted to close said air conduit, a flat annular pressure ring supporting and compressing said elastic rubber member against the air pressure from the tire, a pressure spring forcing said pressure ring against said air pressure, an indicating scale longitudinally positioned on the side of said removable tubular member adapted to indicate the pressure within said tire, an indicating member moving with said annular pressure ring in juxtaposition with said scale and adapted to indicate the pounds pressure in said tire, and the sliding tube 28, having the hole 41, provided to release the excessive air pressure, substantially as set forth.

3. A lockable, removable, pressure indicating, valve stem of the class described for pneumatic tires for vehicles, comprising in combination a base tube member directly connected to the pneumatic tire, a removable tubular stem member threadably connected to said base tube member and having an enlarged integral flange at its connected end adapted to prevent it from passing out through the hole provided for the passage of the outer end of the valve stem through the rim of the wheel, a male-and-female-nut member 11, threadably connecting said enlarged integral flange 7ª with said base tube member 5, a central tube member 4 connected to and registering with base tube member 5 and adapted to open a check valve in member 5 when inserted against it by compressing a closing spring about the stem of said check valve and allowing a direct connection with a registering airway through the length of the parts of said valve stem to the intake valve at its end, a ring-shaped expandible rubber air sack extending around said tube member 4 and having its inner upper edge secured air tight to the metal walls of tube member 4 and having its outer upper edge secured air tight to the inner surface of the outer wall of the removable stem member and the air in said air sack being in direct communication with said pneumatic tire while attached, a flat pressure ring actuated by a pressure spring forcing the bottom of said air sack against the pressure therein and within said pneumatic tire, and an indexed indicating scale in juxtaposition to said pressure ring positioned to indicate the pounds pressure within said tire by the movements of said pressure ring along said scale.

4. A lockable, removable, pressure-indicating, valve stem of the class described for pneumatic tires for vehicles, comprising in combination a base tube member directly connected to the pneumatic tire, a removable tubular stem member connected to said base member indirectly by means of a male-and-female nut, a set screw adapted to lock said nut to said removable tubular stem member, a broadened integral flange at the base of said removable tubular stem member adapted to prevent it from being removed out through the hole provided in the wheel rim for the outward passage of the outer end of said valve stem, said male-and-female nut connecting said two tube members threadably, a check valve in said base tube member adapted to be closed by a pressure spring and to be opened by pressure from said removable tubular stem member when attached to said base tube member, said removable tubular stem member comprising a central tube member threadably connected with said broadened integral flange by said nut, and an upper tube member forming a cap to the interior of an air chamber by being threadably secured within the upper end of said removable tubular stem member and having a circular air way centrally positioned from said air chamber to the outer end of the valve stem, an intake check valve at the outer end of said upper tube member, and a ring-shaped expandible rubber air sack extending around said central tube member and having its outer free edge secured air tight to the inner wall of said removable tubular stem member, and its inner free wall secured air tight to the outer face of said central tube member and forming an air chamber in direct communication with the pneumatic tire, a pressure spring actuating pressure against an annular base member against the bottom of said air sack and causing said base member to move against the pressure of the air in said tire and said air sack, and a scale upon which said annular base member indicates the pressure within said tire as it moves, substantially as set forth.

5. In a valve stem of the class described having an air tight expandible pressure chamber in direct communication with the pneumatic tire to which it is operatively secured, a metal tube forming the outer shell of the stem of said chamber, a tubular nut secured within the outer end of said metal tube and forming the dome-top to said chamber, a central tube extending from the base of said valve stem to near the top of the said dome-top leaving an open space between it and said tubular nut, a ring-shaped expandible rubber air sack positioned between said central tube and said outer shell and having its free outer upper edge secured air-tight to said outer shell and its free inner upper edge secured air tight to the outer wall of said central tube and thus forming the bottom and middle part of said expandible pressure chamber, a flat ring-shaped base member forced against the under bottom of said air sack by a pressure spring acting against the air pressure within said air sack and said pneumatic tire, a visibly exposed pressure scale along which said ring-shaped base member moves indicating the varying pressure within said air sack and said tire, and a slidably mounted extension tube positioned in and extending downwardly from said dome-top of said tubular nut and adapted to extend into a recess provided in the end of said central tube to form the continuous air tube from the air supply chuck to the pneumatic tire to which it is connected, a suitable check valve operatively mounted in the air way of said tubular nut near its outer end, a valve shaft member passing through said check valve and at its lower end slidably carrying said extension tube substantially as set forth, and for the purposes specified.

KENNETH BARTON STUART.